United States Patent
Martinez

(10) Patent No.: US 10,273,862 B2
(45) Date of Patent: Apr. 30, 2019

(54) ENGINE EXHAUST EXTRACTOR WITH INTERNAL AIRFOILS AND METHOD OF MANUFACTURING

(71) Applicant: Roy R. Martinez, La Habra, CA (US)

(72) Inventor: Roy R. Martinez, La Habra, CA (US)

(73) Assignee: EXHAUST THRUSTER, LLC, Fullerton, CA (US)

( * ) Notice: Subject to any disclaimer, the term of this patent is extended or adjusted under 35 U.S.C. 154(b) by 176 days.

(21) Appl. No.: 15/433,657

(22) Filed: Feb. 15, 2017

(65) Prior Publication Data

US 2018/0230887 A1   Aug. 16, 2018

(51) Int. Cl.
*F01N 13/08*   (2010.01)
*F01N 1/12*   (2006.01)
*F02B 27/04*   (2006.01)

(52) U.S. Cl.
CPC .............. *F01N 13/08* (2013.01); *F01N 1/12* (2013.01); *F01N 13/082* (2013.01); *F02B 27/04* (2013.01); *F01N 2260/06* (2013.01); *F01N 2290/04* (2013.01); *F01N 2450/22* (2013.01); *F01N 2470/08* (2013.01); *F01N 2470/24* (2013.01)

(58) Field of Classification Search
CPC ...... F01N 1/12; F01N 13/082; F01N 2260/06; F01N 2470/08; F01N 2470/24; F02B 27/04
See application file for complete search history.

(56) References Cited

U.S. PATENT DOCUMENTS

| | | | | |
|---|---|---|---|---|
| 3,586,123 A | * | 6/1971 | Marlowe | F01N 1/003 181/273 |
| 3,633,343 A | * | 1/1972 | Mark | F01N 3/0217 55/323 |
| 3,813,854 A | * | 6/1974 | Hortman | B01D 45/16 55/399 |
| 4,050,539 A | * | 9/1977 | Kashiwara | F01N 1/06 181/228 |
| 4,683,978 A | * | 8/1987 | Venter | F01N 1/12 181/258 |
| 4,792,014 A | * | 12/1988 | Shin-Seng | F01N 13/082 181/227 |
| 6,889,500 B1 | * | 5/2005 | Martinez | F01N 1/12 60/312 |

(Continued)

*Primary Examiner* — Audrey K Bradley
(74) *Attorney, Agent, or Firm* — Kenneth L. Green; Averill & Green

(57) ABSTRACT

An improved engine exhaust extractor improves internal combustion engine performance and efficiency. The exhaust extractor includes coaxial inner and outer tubes separating a flow into an inner flow inside the inner tube and an outer flow between the tubes and merging near the exhaust extractor outlet. Helically oriented vanes extend radially from an outer face of the inner tube and reliefs are cut into the inner tube to allow gasses to flow to the outer flow. The inner tube is held in place by end pieces connecting the inner tube to the outer tube. The end pieces include fan blades with wing shaped cross-sections to increase the velocity of exhaust gasses flowing through the exhaust extractor. The fan-like supports and helically oriented vanes cause the outer flow to rotate about a central axis. The exhaust extractor is constructed from only six parts requiring only two welds.

19 Claims, 5 Drawing Sheets

(56) References Cited

U.S. PATENT DOCUMENTS

| | | | |
|---|---|---|---|
| 7,331,422 B2 * | 2/2008 | Wall | F01N 1/085 |
| | | | 181/249 |
| 8,234,859 B2 * | 8/2012 | Shirra | F01N 1/088 |
| | | | 60/312 |

* cited by examiner

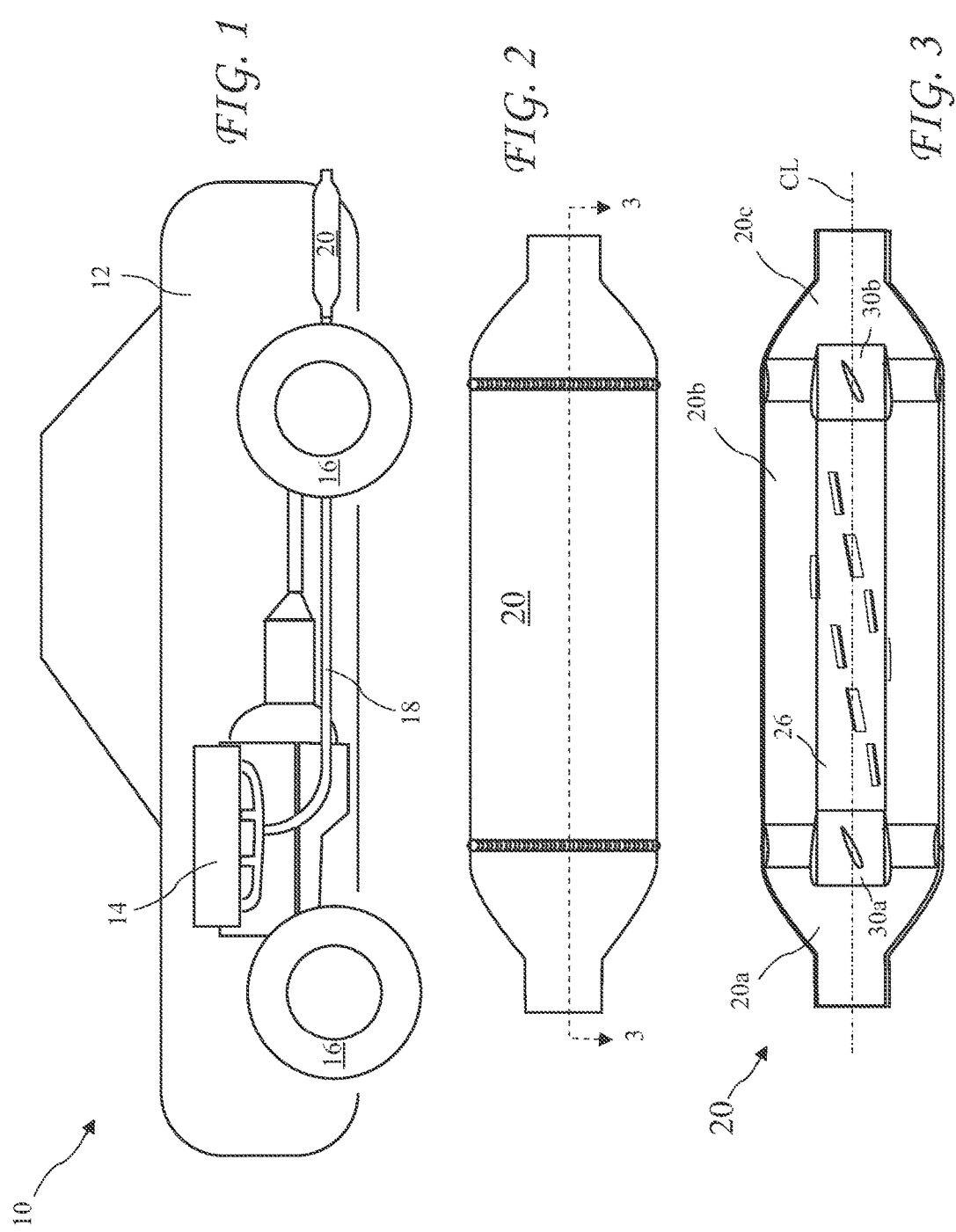

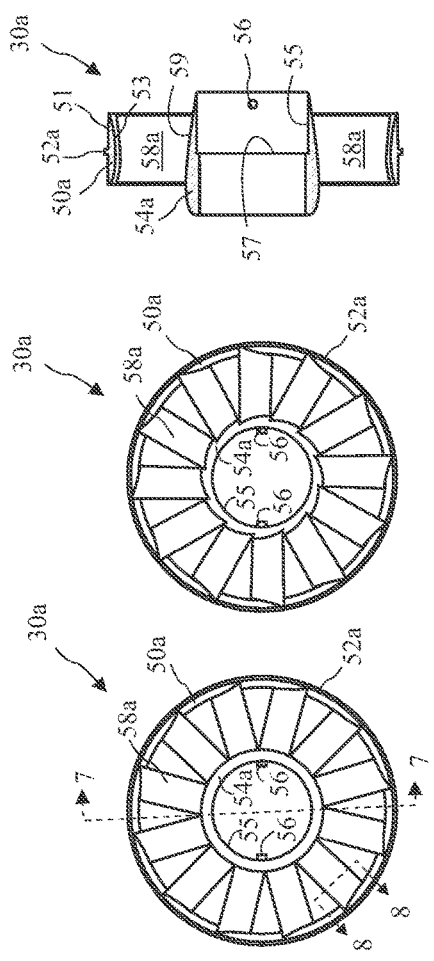

ENGINE EXHAUST EXTRACTOR WITH INTERNAL AIRFOILS AND METHOD OF MANUFACTURING

BACKGROUND OF THE INVENTION

The present invention relates to improving the efficiency of internal combustion engines, and in particular to an exhaust system which aids in extracting exhaust gases from the combustion chamber.

There is a continuing desire to improve the performance, efficiency, and environmental friendliness of internal combustion engines. Cars, motorcycles, and event trucks are raced every weekend in the United States. Even a small increase in power can provide a dramatic advantage in racing. The efficiency of exhaust systems is known to be a critical aspect of engine performance, and attempts to improve exhaust systems to unlock power have been ongoing for many years.

Increasing energy costs have also motivated manufactures to continually seek to improve vehicle mileage, both to gain market share, and to satisfy government mileage requirements. Improvements to exhaust systems in the form of reduced restriction and tuned lengths have become common place, and vehicle mileage has somewhat benefitted from such efforts. However, meeting federally mandated mileage requirements remains a challenge, and further improvements are necessary.

Reducing pollution continues to be an important societal objective. Pollution levels in metropolitan areas remain unacceptably high at times, and create an immediate direct health issue for humans, and a longer term issue due to the damage to plant life. Automotive based pollution remains an issue, and auto makers are continually challenged to reduce the emissions from new automobiles. Further, the emissions from older vehicles continues even if new vehicles achieve significant emission reductions.

Modern automobiles greatly benefit from Electronic Fuel Injection (EFI) systems and efficient intake manifold and head designs. As a result, new automobiles have greatly improved economy and reduced emissions. But while the intake aspect of engine design has advanced drastically, exhaust systems have not similarly advanced. U.S. Pat. No. 6,213,251 issued Apr. 10, 2001 for "Self Tuning Exhaust Muffler," describes a muffler having an outer tube and an inner louver tube, wherein a spiral vane extending from the louver tube to the outer tube and forming a helical passage for a flow between the louver tube and the outer tube. A multiplicity of "scoops" on the inside wall of the louvered tube "scoop" an outer portion of the flow through the louvered tube into the helical passage.

U.S. Pat. No. 6,679,351 issued Jan. 20, 2004 for "Air Turbine for Combustion Engine," describes an "air turbine" apparatus creating a rotational flow which creates a muffling effect without restricting flow. The apparatus of the '351 patent includes annular recesses (or convolutions) at the forward end (i.e., before the diameter increases) of the apparatus, which are intended to create a cyclone or vortex effect in the air flow. Following the annular recesses, the air flow enters an expansion chamber, wherein an airfoil is positioned at the front of the expansion chamber to split the air flow into a high velocity lower pressure outer vortex, and a lower velocity higher pressure inner vortex. The air foil is shown in several figures of the '351 patent, and clearly plays the dominant role in the flow characteristics of a muffler according to the '351 patent and is essential to the described invention. Further, in column 4, lines 22-25, the '351 patent states that "the ratio of air passing around the airfoil compared to the air passing through the airfoil for a six inch diameter expansion chamber is approximately 2.7 to 1," indicating that the air foil plays the dominant role on controlling air flow through the muffler. Additionally, FIG. 10 of the '351 patent shows an embodiment of the invention of the '351 patent which essentially consists of the annular rings and the airfoil, and the inner tube 22 is entirely absent.

U.S. Pat. No. 6,889,500 for "ENGINE EXHAUST EXTRACTOR" filed by the present inventor discloses an exhaust extractor with an inner tube having helical vanes on the exterior and reliefs residing parallel to the vanes. The vanes create a rotating flow of exhaust and draws exhaust from the inner tube into the outer tube thereby increasing flow through the muffler and extracting exhaust from the engine. Unfortunately, the exhaust extractor disclosed in the '500 patent is somewhat complex and expensive to manufacture. Further, the exhaust extractor of the '500 patent would benefit from increased velocity of exhaust flowing there through.

BRIEF SUMMARY OF THE INVENTION

The present invention addresses the above and other needs by providing an improved engine exhaust extractor which improves internal combustion engine performance and efficiency. The exhaust extractor includes coaxial inner and outer tubes separating a flow into an inner flow inside the inner tube and an outer flow between the tubes and merging near the exhaust extractor outlet. Helically oriented vanes extend radially from an outer face of the inner tube and reliefs are cut into the inner tube to allow gasses to flow to the outer flow. The inner tube is held in place by end pieces connecting the inner tube to the outer tube. The end pieces include a fan-like structure with wing shaped cross-section to increase the velocity of exhaust gasses flowing through the exhaust extractor. The fan-like supports and helically oriented vanes cause the outer flow to rotate about a central axis. The exhaust extractor is constructed from only six parts requiring only two welds.

In accordance with one aspect of the invention, there is provided exhaust extractor for an internal combustion engine. The exhaust extractor includes an outer tube, an inner tube residing inside the outer tube, and end pieces at each end of the inner tube. The inner tube includes pairs of spaced apart vanes and reliefs in a helix pattern over the length of the inner tube and attaching features at opposite ends of the inner tube. The end pieces include a center portion including engaging features configured to cooperate with the attaching features to attach the end pieces to the inner tube, fan blades having a wing shaped cross-section and extending radially out from the center portions and turned between 20 degrees and 45 degrees with respect to a centerline of the exhaust extractor to create a rotational motion in exhaust gasses passing through the fans, and rings having a ring inner surface attached to the fan blades and a ring outer surface attached to the ends of the outer tube, and having a stop for positioning the rings inside the ends of the outer tube. End cones are attached to each end piece ring opposite to the outer tube ends and one weld at each junction between the outer tube and each end cone joins each end of the outer tube to one of the end pieces and a corresponding one of the end cones at opposite ends of the outer tube.

In accordance with another aspect of the invention, there is provided a method for assembling an exhaust extractor according to the present invention. The method includes attaching a first end piece to a first end of an inner tube by engaging first dowels into first locks, inserting the inner tube and the attached first end piece into a first end of an outer tube up to a stop ring of the first end piece, inserting the second end piece into an opposite end of the outer tube up to the stop ring while engaging second dowels of the second end piece with second locks on an opposite end of the inner tube, sliding end cones over the exposed portions of each end piece, and jointly welding the end cones, end pieces, and outer tube at each end of the outer tube to form the completed exhaust extractor.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein:

FIG. 1 is an internal engine powered vehicle including an improved exhaust extractor according to the present invention.

FIG. 2 is a side view of the improved exhaust extractor according to the present invention.

FIG. 3 is a cut away view showing internal parts of the improved exhaust extractor according to the present invention.

FIG. 6A is a front view of a first end piece of the improved exhaust extractor according to the present invention.

FIG. 6B is a rear view of the first end piece of the improved exhaust extractor according to the present invention.

FIG. 7 is a cross-sectional view of the first end piece of the improved exhaust extractor according to the present invention taken along line 7-7 of FIG. 6A.

FIG. 8 is a cross-sectional view of the first end piece of the improved exhaust extractor according to the present invention taken along line 8-8 of FIG. 6A.

FIG. 8A is a cross-sectional view of an alternative first end piece of the improved exhaust extractor according to the present invention taken along line 8-8 of FIG. 6A.

FIG. 9A is a front view of a second end piece of the improved exhaust extractor according to the present invention.

FIG. 9B is a rear view of the second end piece of the improved exhaust extractor according to the present invention.

FIG. 10 is a cross-sectional view of the second end piece of the improved exhaust extractor according to the present invention taken along line 10-10 of FIG. 9A.

FIG. 11 is a cross-sectional view of the second end piece of the improved exhaust extractor according to the present invention taken along line 11-11 of FIG. 9A.

FIG. 12 is an unwrapped view of an inner tube showing vanes and reliefs.

Corresponding reference characters indicate corresponding components throughout the several views of the drawings.

DETAILED DESCRIPTION OF THE INVENTION

Figure 4:
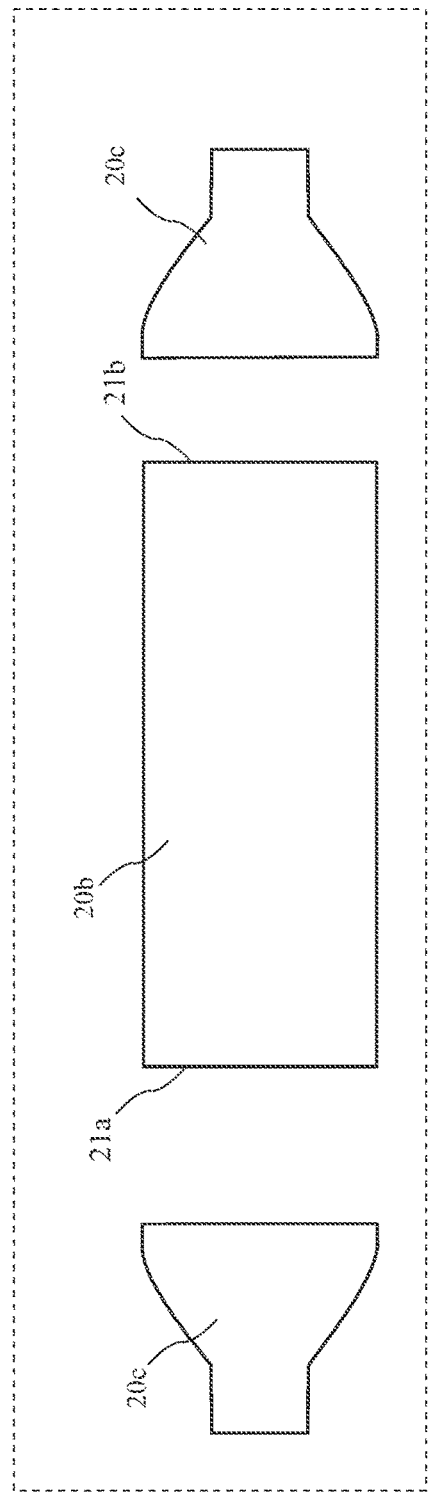
FIG. 4 shows outer parts of the improved exhaust extractor according to the present invention.

The following description is of the best mode presently contemplated for carrying out the invention. This description is not to be taken in a limiting sense, but is made merely for the purpose of describing one or more preferred embodiments of the invention. The scope of the invention should be determined with reference to the claims.

Several elements of the exhaust extractor are described herein as having a wing shape or a wing shaped cross-section. The term "wing" is used herein to describe a shape with a somewhat blunt or rounded leading edge, a thickest point closer to the leading edge than a trailing edge, and tapering from the thickest point to the trailing edge. The leading edge is not necessarily rounded, but is less pointed than the trailing edge.

A vehicle 10 including a body 12, an engine 14, and wheels 16 is shown in FIG. 1. The engine 14 consumes fuel and produces exhaust which passes through an exhaust pipe 18 and exits the vehicle through an improved exhaust extractor 20. The improved exhaust extractor 20 may be used independently, or in conjunction with other exhaust devices such as a catalytic converter or a muffler. In vehicles with two or more exhaust pipes 18, one improved exhaust extractor 20 may be used with each exhaust pipe.

A side view of the improved exhaust extractor 20 is shown in FIG. 2 and a cut away view of the improved exhaust extractor 20 is shown in FIG. 3. The improved exhaust extractor 20 includes an outer tube 20b, a first end cone 20a and a second end cone 20c. The exhaust flow enters the exhaust extractor 20 through the first end cone 20a and leaves the exhaust extractor 20 through the second end cone 20c. The end cones 20a and 20c may be conical, may be rounded (i.e., shoulder-like) portions as shown in FIG. 2, and may be a mix of rounded and conical portions. The outer tube 20b is preferably between approximately 2.5 inches in diameter to approximately 4.5 inches in diameter, and preferably between approximately twelve inches long and approximately fifteen inches long.

Continuing with FIGS. 2 and 3, the improved exhaust extractor 20 further includes an inner tube 26 which is substantially co-axial with the outer tube 28 and preferably shares a center line CL. A first end piece 30a and a second end piece 30b are attached to first and second ends of the inner tube 26 and connect the inner tube 26 to the outer tube 20b. The end pieces 30a and 30b are preferably formed using investment casting.

The first end cone 20a, outer tube 20b and second end cone 20 are shown separated in FIG. 4. The outer tube has a first end 21a and a second end 21b.

Figure 5:
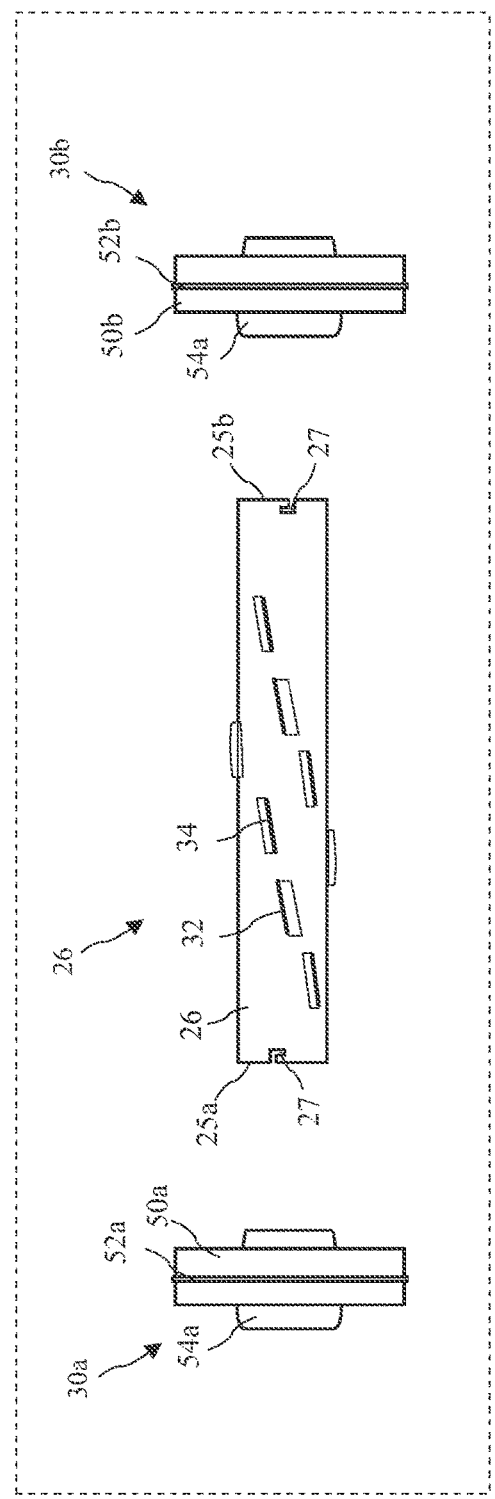
FIG. 5 shows inner parts of the improved exhaust extractor according to the present invention.

The first end piece 30a, inner tube 26, and second end piece 30b are shown separated in FIG. 5. The first end piece 30a and the second end piece 30b are attached to opposite ends 25a and 25b of the inner tube 26 during assembly of the exhaust extractor 20. Helically oriented vanes 32 are formed on the inner tube 26 and extend radially outward from the inner tube 26. The vanes 32 preferably extend radially outward approximately ¼ inches. Reliefs (or windows) 34 are cut into the inner tube 26 in a helical pattern similar and preferably parallel to the orientation of the vanes 32. The vanes 32 and reliefs 34 are more preferably jointly formed in the inner tube 26 by making a three sided cut in the inner tube 26 and folding metal out to form the reliefs 34 and the vanes 32 in a single operation. The cuts are preferably laser cuts.

The end pieces 30a and 30b include first and second center portions 54a and 54b which contact the inner tube 26 and first and second outer rings 50a and 50b which preferably contact both the outer tube 20b and the cones 20a and 20c. First and second stops (or stop rings) 52a and 52b reside on an outer face 51 of the outer rings 50a and 50b. The outer face 51 directly contacts an inner face of the outer tube 20b and the stops 52a and 52b limit the depth of insertion of the end pieces 30a and 30b into the outer ring 20b, thereby positioning the end pieces 30a and 30b in the outer tube 20b. The inner tube 26 includes attaching features 27 in attaching ends 25a and 25b of the inner tube 26 for cooperation with engaging features 56 (see FIGS. 6A and 9A) on inner faces 55 of the center portions 54a and 54b to attach the end pieces 30a and 30b to the inner tube 26. The attaching (or locking) features 27 are preferably "L" shaped cuts and the engaging features are preferably dowels 56 (see FIGS. 6A and 9A).

A front view of the first end piece 30a is shown in FIG. 6A, a rear view of the first end piece 30a is shown in FIG. 6B, a cross-sectional view of the first end piece 30a taken along line 7-7 of FIG. 6A is shown in FIG. 7, and a cross-sectional view of the first end piece 30a taken along line 8-8 of FIG. 6A is shown in FIG. 8. The first end piece 30a includes a fan-like structure (or fan blades) 58a connected between an outer surface 59 of the center portion 54a, and an inner surface 53 of the outer ring 50a. Individual fan blades 58a are turned an angle A1 with respect to a centerline of the inner tube 26 to cause a flow into the exhaust extractor 20 to rotate as the flow passes through the exhaust extractor 20. The angle A1 is preferably between 20 degrees and 45 degrees. The individual fan blades 58a have a wing like profile to increase the speed of the flow as the flow passes over the individual blades. The blades have a length L1 and a width (or thickness) W1. The length L1 is preferably between ⅜ inches and one inch and the width W1 is preferably between 0.050 inches and 0.070 inches. The fan blades 58a preferably comprises 12 equally angularly spaced apart blades (i.e., spaced 30 degrees apart). The interior of the center portion 54a includes a step 57 for limiting the entry of the inner tube 26 into the center portion 54a.

A cross-sectional view of an alternative first end piece of the improved exhaust extractor according to the present invention taken along line 8-8 of FIG. 6A is shown in FIG. 8A. The alternative first end piece includes curved fan blades 58a' which improve flow in some applications. Such curved fan blades may also is incorporated into an alternative second end piece.

A front view of the second end piece 30b is shown in FIG. 9A, a rear view of the second end piece 30b is shown in FIG. 9B, a cross-sectional view of the second end piece 30b taken along line 10-10 of FIG. 9A is shown in FIG. 10, and a cross-sectional view of the second end piece 30b taken along line 11-11 of FIG. 9A is shown in FIG. 11. The second end piece 30b includes fan blades 58b connected between the outer surface 59 of the center portion 54b, and an inner surface 53 the outer ring 50b. Individual fan blades 58b are preferably turned an angle A2 to cooperate with the rotating flow as the flow passes out of the exhaust extractor 20. The angle A2 is preferably between 20 degrees and 45 degrees. The fan blades 58b preferably have a wing like profile to increase the speed of the flow and the flow passes past the individual blades. The blades have a length L2 and a width W2. The length L2 is preferably between ⅜ inches and one inch and the width W2 is preferably between 0.050 inches and 0.070 inches. The fan blades 58b preferably comprises four pairs of two blades, the two blades in each pair are preferably space approximately 30 degrees apart and the pairs are spaced approximately 90 degree apart. The interior of the center portion 54b includes a step 57 for limiting the entry of the inner tube 26 into the center portion 54b.

An unwrapped view of an inner tube 26 showing the vanes 32 and reliefs 34 is shown in FIG. 12. The vanes 32 and reliefs 34 follow a helix path and have a length L3, are spaced apart a distance D1, and the helix path is at an angle A3 to the centerline of the inner tube 26. The distance D1 is preferable approximately ¼ inches, length L3 is preferable approximately one inches, and the angle A1 is preferably approximately 30 degrees. The vanes 32 and reliefs 34 may be jointly formed by making laser cuts in a plain tube and then bending the material outward, or the inner tube may be an investment casting.

Further, the center portions 54a and 54b may have a wing shaped outer surface 59, and the outer rings 50a and 50b may have a wing shaped inner surface 53. The wing shaped surfaces provide less restriction and an improved flow through the exhaust extractor 20.

Figure 13:
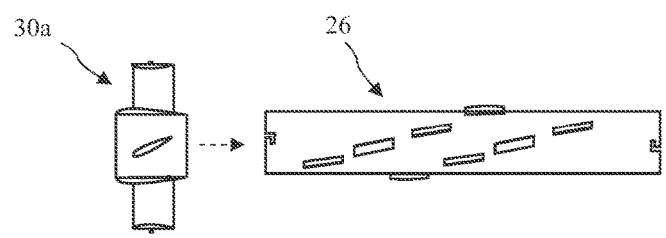
FIG. 13 shows a first step in a method for assembling the exhaust extractor according to the present invention.
Figure 14:
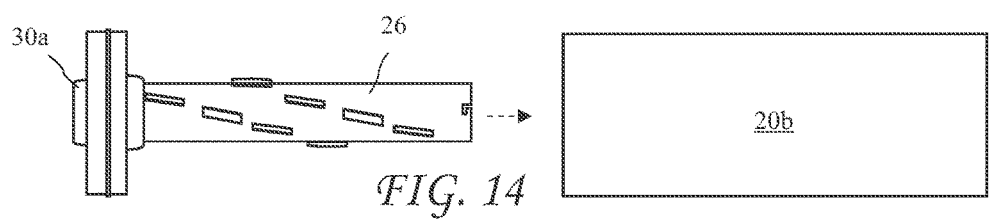
FIG. 14 shows a second step in the method for assembling the exhaust extractor according to the present invention.
Figure 15:
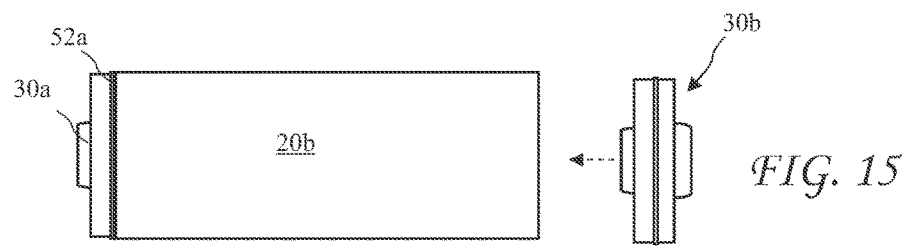
FIG. 15 shows a third step in the method for assembling the exhaust extractor according to the present invention.
Figure 16:
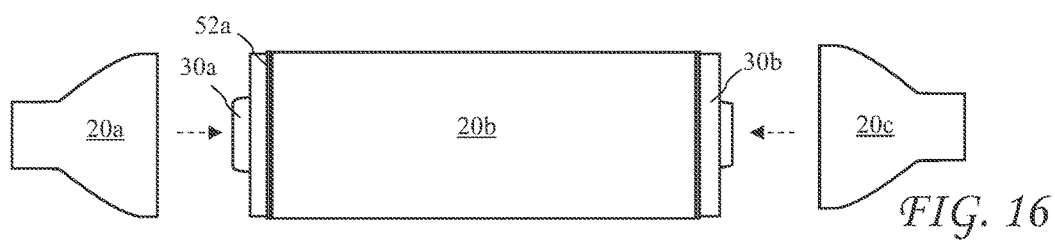
FIG. 16 shows a fourth step in the method for assembling the exhaust extractor according to the present invention.
Figure 17:
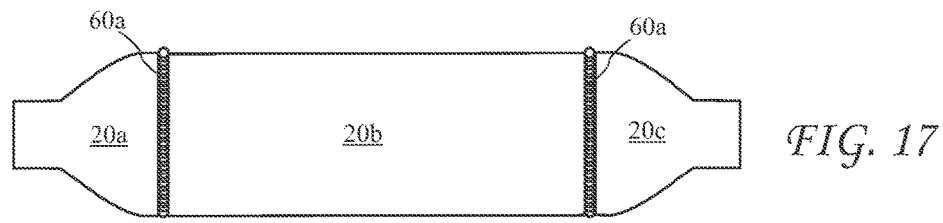
FIG. 17 shows a fifth step in the method for assembling the exhaust extractor according to the present invention.
Figure 18:
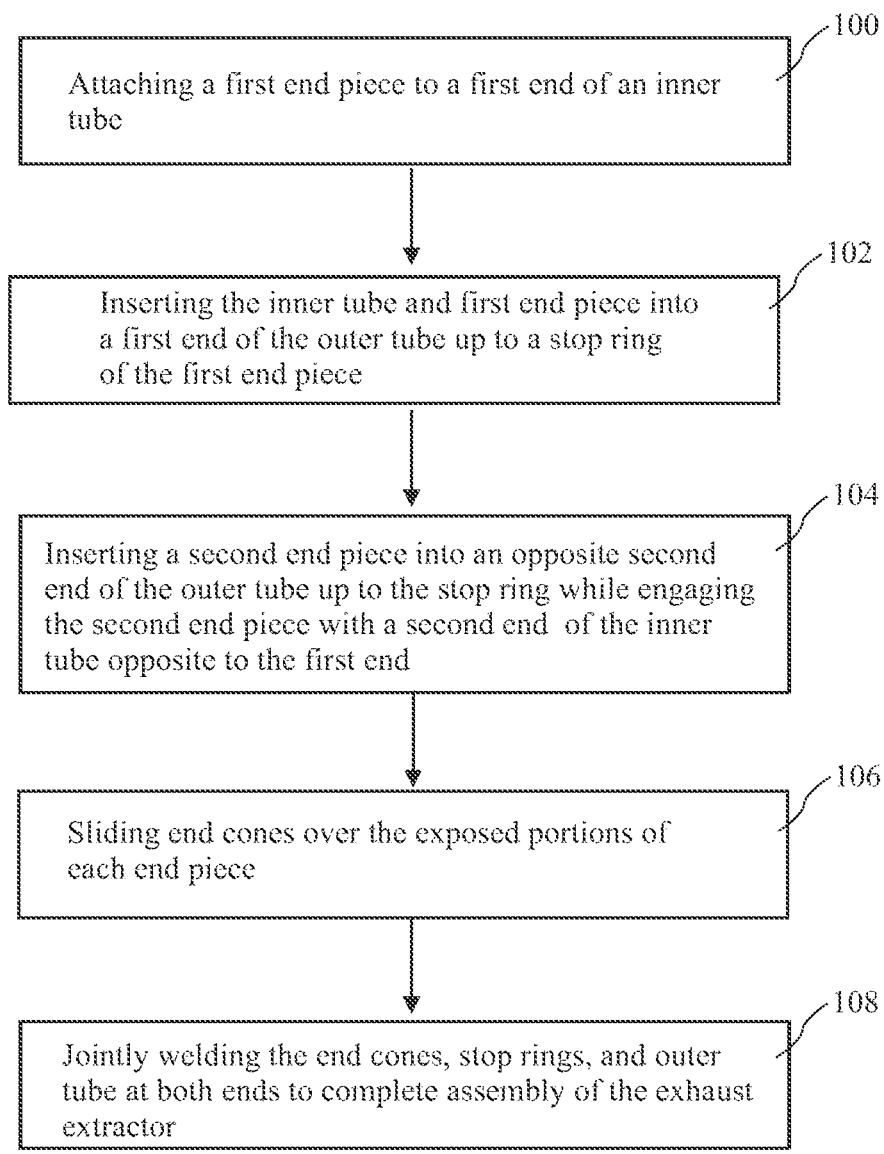
FIG. 18 shows the method for assembling the exhaust extractor according to the present invention.

A first step in a method for assembling the exhaust extractor 20 according to the present invention is shown in FIG. 13, a second step in the method for assembling the exhaust extractor 20 is shown in FIG. 14, a third step in the method for assembling the exhaust extractor 20 is shown in FIG. 15, a fourth step in the method for assembling the exhaust extractor 20 is shown in FIG. 16, a fifth step in the method for assembling the exhaust extractor 20 is shown in FIG. 17, and the complete method for assembling the exhaust extractor 20 is described in steps in FIG. 18. The assembling includes attaching a first end piece to a first end of an inner tube at step 100 and as shown in FIG. 13, inserting the assembled inner tube and first end piece into a first end of the outer tube up to a stop ring of the first end piece at step 102 and as shown in FIG. 14, inserting a second end piece into an opposite second end of the outer tube up to the stop ring while engaging the second end piece with a second end of the inner tube opposite to the first end at step 104 and as shown in FIG. 15, sliding end cones over exposed portions of each end piece at step 106 and as shown in FIG. 16, and jointly welding the end cones, end pieces, and outer tube at both ends to complete assembly of the exhaust extractor at step 108 and as shown in FIG. forming welds 60a and 60b. Preferably, the inner tube includes "L" shaped locks and an interior surface of the end pieces includes dowels, allowing the end pieces to the attached to the inner tube by longitudinally introducing the dowels into the locks and then twisting the end pieces to lock the attach the end pieces to the inner tube.

While the method of assembly is a preferred method for the exhaust extractor according to the present invention, the exhaust extractor may be assembled in other ways, and any exhaust extractor having wing shaped blades is intended to come with the scope of the present invention. Further, the method of assembly may apply to other similar devices, and any similar device assembled according to the method of assembly of the present invention is intended to come within the scope of the present invention.

An improved exhaust extractor 20 according to the present invention has been constructed and tested on a variety of vehicles. It is believed that the outer flow between the inner tube 26 and the outer tube 20b is accelerated and converted into a vortex like flow by the helically oriented vanes 32 and fan blade like supports 30a, 30b. Thus accelerated, when the flows recombine in the second end cone 20c, the flow through the inner tube is drawn out of the inner tube 26, thereby extracting the exhaust from the engine 14, and improving performance. The results of testing before and after installation of one or more exhaust extractors 20 are summarized in Table 1. As can be seen, the performance improvements were substantial. Further, independent lad tests have shown show a 23 percent improvement in fuel economy, almost 18 percent reduction in hydro carbons, almost 28 percent reductions in carbon monoxide, almost ten percent in NOX, and a reduction in CO2 of almost seven percent.

TABLE 1

| Vehicle | Original | With Exhaust Extractor |
| --- | --- | --- |
| 1989 Toyota Pickup (carburetor) 2.2 Ltr | 139 foot pounds torque HC .53 CO .23 22 MPG | 191 foot pounds torque HC .10 CO .01 31.7 MPG |
| 1995 Mustang GT 5.0 | 241 foot pounds torque | 298+ foot pounds torque |
| 1996 Dodge Pickup | | +20 foot pounds torque |
| 2004 Mustang Mach 1 | 268 foot pounds torque | 280 foot pounds torque |

Although it is believed that the performance improvements are obtained as described above, the present invention is not limited to a device functioning as described, and any device functioning in any manner, which device includes the structure described and claimed herein, is intended to come within the scope of the present invention.

While the invention herein disclosed has been described by means of specific embodiments and applications thereof, numerous modifications and variations could be made thereto by those skilled in the art without departing from the scope of the invention set forth in the claims.

I claim:

1. An exhaust extractor for an internal combustion engine, the exhaust extractor comprising:
    an outer tube having a first end and a second end opposite the first end;
    an inner tube residing inside the outer tube and having pairs of spaced apart helically oriented vanes and reliefs in a helix pattern over most of the length of the inner tube;
    a first end piece comprising:
        a first center portion attached to the inner tube;
        first fan blades extending radially out from the first center portion and turned to create a rotational motion in exhaust gasses passing through the first fan blades; and
        a first ring having a first ring inner surface attached to the first fan blades and a first ring outer face joined to the first end of the outer tube;
    a second end piece comprising:
        a second center portion attached to the inner tube at an end of the inner tube opposite the first end piece;
        second fan blades extending radially out from the second center portion; and
        a second ring having a second ring inner surface attached to the second fan blades and a second ring outer face joined to the second end of the outer tube;
    a first end cone attached to the first ring outer face of the first ring adjacent to the first outer tube end; and
    a second end cone attached to the second ring outer face of the second ring adjacent to the second outer tube end.

2. The exhaust extractor of claim 1, wherein:
    the center portions include cylindrical inner passages which slide over the inner tube; and
    the cylindrical inner passages includes steps for limiting the entry of the inner tube into the cylindrical inner passages.

3. The exhaust extractor of claim 1, wherein the second fan blades are turned to facilitate the rotational motion in the exhaust gasses passing through the second fan blades.

4. The exhaust extractor of claim 1, wherein the center portions of the end pieces have wing shaped outer surfaces.

5. The exhaust extractor of claim 1, wherein the ring inner surfaces of the end pieces have a wing shape.

6. The exhaust extractor of claim 1, wherein the exhaust extractor is assembled by:
    engaging first engaging features of the first end piece with first attaching features on the first attaching end of the inner tube comprises engaging first dowels on an interior surface of the first end piece with slots on the first attaching end of the inner tube; and
    engaging second engaging features of the second end piece with second attaching features on the second attaching end of the inner tube comprises engaging second engaging second dowels on an interior surface of the second end piece with second slots on a second attaching end of the inner tube.

7. The exhaust extractor of claim 1, wherein the vanes and reliefs are one inch long and are spaced apart by ¼ inches.

8. The exhaust extractor of claim 7, wherein the helical pattern of the vanes and reliefs is at an angle of 30 degrees from a centerline of the inner tube.

9. The exhaust extractor of claim 1, wherein fan blades have a wing shape.

10. The exhaust extractor of claim 9, wherein fan blades are turned between 20 and 45 degrees from the centerline of the inner tube to create the rotational motion in exhaust gasses passing through the first fan blades.

11. The exhaust extractor of claim 1, wherein:
    the inner tube includes attaching features at a first attaching end and at a second attaching end opposite the first attaching end; and
    the center portions include engaging features configured to cooperate with the attaching features to attach the center portions to the attaching ends of the inner tube.

12. The exhaust extractor of claim 11, wherein:
    the center portions include cylindrical inner passages which slide over the attaching ends of the inner tube for assembly; and
    dowels reside in the cylindrical inner passages and engage slots on the ends of the inner tube.

13. The exhaust extractor of claim 12, wherein the slots in the inner tube are "L" shaped slots.

14. The exhaust extractor of claim 1, further including stops on the ring outer face of each ring, the stops cooperating with the outer tube to limit insertion of the end pieces into the outer tube.

15. The exhaust extractor of claim 14, wherein the stops further cooperate with the end cones to establish the positions of the end cones on the exterior surface of each ring of the end pieces.

16. The exhaust extractor of claim 15, wherein the completed exhaust extractor includes only two welds, each weld joining an end of the outer tube to one of the end pieces and one of the end cones.

17. An exhaust extractor for an internal combustion engine, the exhaust extractor comprising:
  an outer tube having a first end and a second end opposite the first end;
  an inner tube residing inside the outer tube and having pairs of spaced apart helically oriented vanes and reliefs in a helix pattern over most of the length of the inner tube, the inner tube including attaching features at a first attaching end and at a second attaching end opposite the first attaching end;
  a first end piece comprising:
    a first center portion including engaging features configured to cooperate with the attaching features to attach the first center portion to the inner tube;
    first fan blades having a wing shaped cross-section and extending radially out from the first center portion and turned between 20 degrees and 45 degrees with respect to a centerline of the exhaust extractor to create a rotational motion in exhaust gasses passing through the first fan; and
    a first ring having a first ring inner surface attached to the first fan blades and a first ring outer face attached to the first end of the outer tube and having a stop for positioning the first ring inside the first end of the outer tube;
  a second end piece comprising:
    a second center portion including engaging features configured to cooperate with the attaching features to attach the second center portion to the inner tube at an end of the inner tube opposite the first end piece;
    second fan blades having the wing shaped cross-section and extending radially out from the second center portion and turned between 20 degrees and 45 degrees with respect to the centerline of the exhaust extractor to facilitate the rotational motion in the exhaust gasses passing through the second fan blades; and
    a second ring having a second ring inner surface attached to the second fan blades and a second ring outer face attached to the second end of the outer tube and having a stop for positioning the second ring inside the second end of the outer tube;
  a first end cone joined to the first ring outer face opposite to the first outer tube end;
  a second end cone joined to the second ring outer face opposite to the second outer tube end; and
  one weld at each junction between the outer tube and each end cone joining the outer tube to a corresponding one of the stop rings and a corresponding one of the end cones.

18. The exhaust extractor of claim 17, wherein the exhaust extractor is assembled by:
  engaging first dowels comprises sliding the first end piece over the first attaching end, and sliding the first dowels into "L" shaped slots in the first attaching end and twisting the first end piece to lock the first end piece into place; and
  engaging second dowels comprises sliding the second end piece over the first attaching end, and sliding the second dowels into second "L" shaped slots in the second attaching end and twisting the second end piece to lock the second end piece into place.

19. A method for manufacturing an exhaust extractor, the method comprising:
  constructing the exhaust extractor comprising:
    an outer tube having a first end and a second end opposite the first end;
    an inner tube residing inside the outer tube and having pairs of spaced apart helically oriented vanes and reliefs in a helix pattern over most of the length of the inner tube;
    a first end piece comprising:
      a first center portion attached to the inner tube;
      first fan blades extending radially out from the first center portion and turned to create a rotational motion in exhaust gasses passing through the first fan blades; and
      a first ring having a first ring inner surface attached to the first fan blades and a first ring outer face joined to the first end of the outer tube;
    a second end piece comprising:
      a second center portion attached to the inner tube at an end of the inner tube opposite the first end piece;
      second fan blades extending radially out from the second center portion; and
      a second ring having a second ring inner surface attached to the second fan blades and a second ring outer face joined to the second end of the outer tube;
    a first end cone attached to the first ring outer face of the first ring adjacent to the first outer tube end; and
    a second end cone attached to the second ring outer face of the second ring adjacent to the second outer tube end;
  attaching the first end piece to a first attaching end of the inner tube by engaging first engaging features of the first end piece with first attaching features on the first attaching end of the inner tube;
  inserting the inner tube and the attached first end piece into the first end of the outer tube up to a first stop of the first end piece;
  inserting the second end piece into an opposite second end of the outer tube up to a second stop while engaging second engaging features of the second end piece with second attaching features on a second attaching end of the inner tube;
  sliding end cones over the exposed portions of each end piece; and
  jointly welding the end cones, end pieces, and outer tube at both ends to form the completed exhaust extractor.

* * * * *